Aug. 28, 1951  H. J. AMUNDSEN, JR  2,565,795
PRODUCE HUMIDOR
Filed Aug. 19, 1948  3 Sheets-Sheet 1

INVENTOR.
HYRUM J. AMUNDSEN, JR.
BY
George H. Mortimer
ATTORNEY

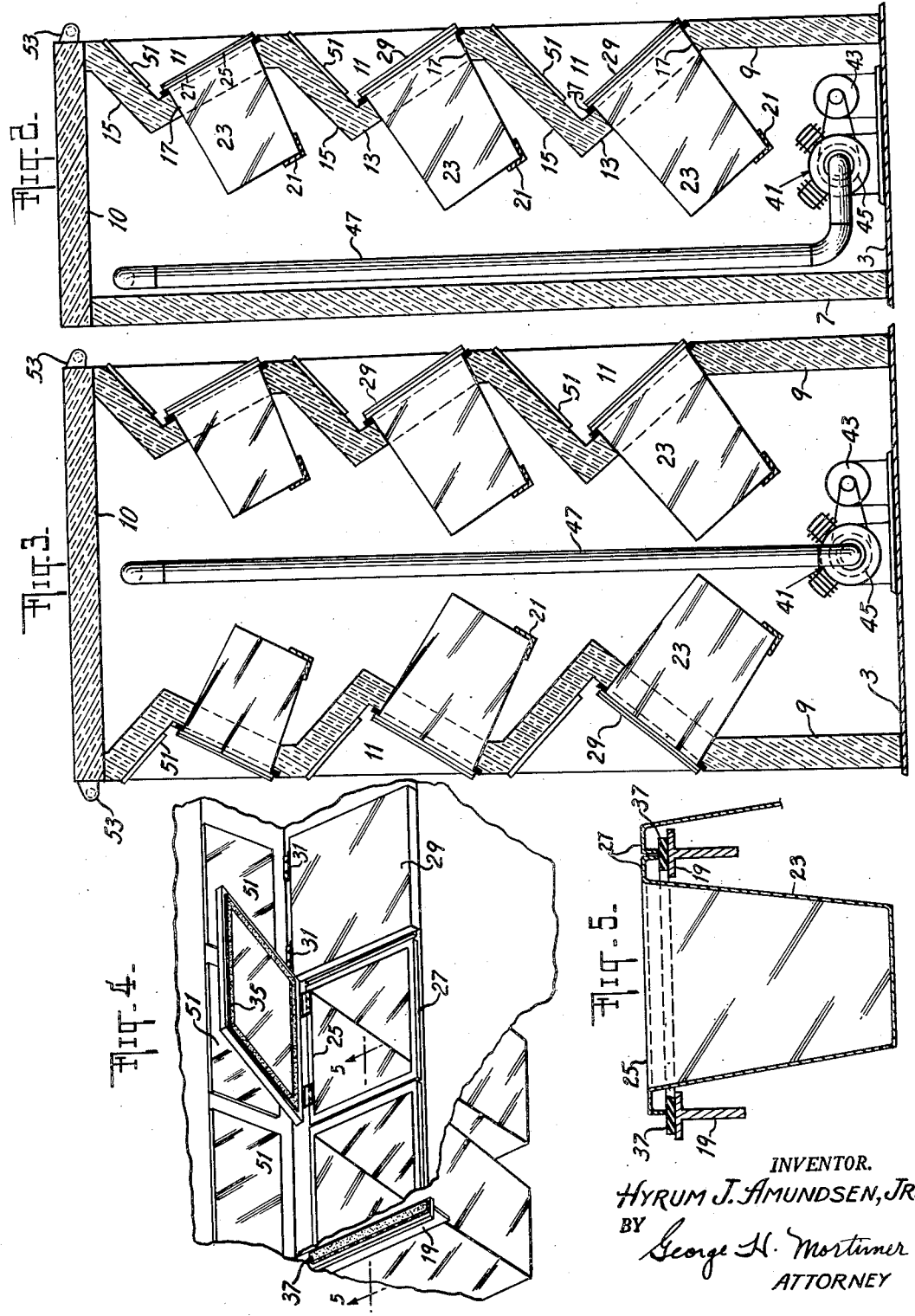

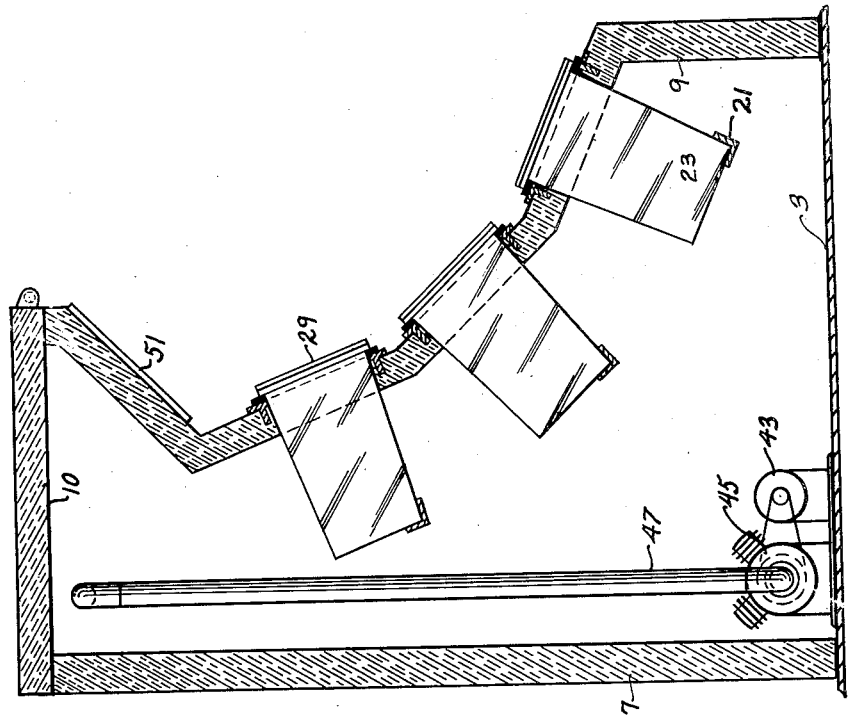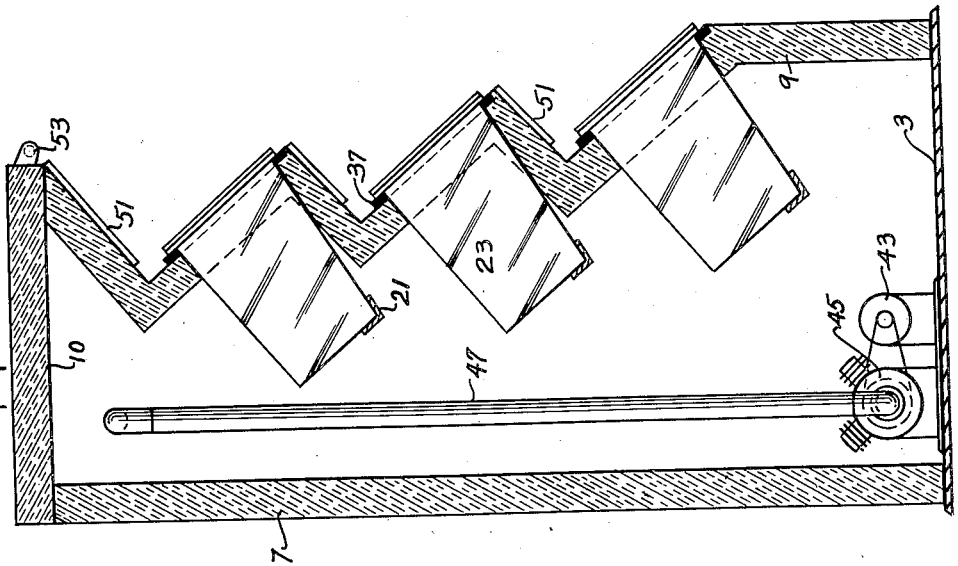

Patented Aug. 28, 1951

2,565,795

UNITED STATES PATENT OFFICE 2,565,795

PRODUCE HUMIDOR

Hyrum J. Amundsen, Jr., Bakersfield, Calif.

Application August 19, 1948, Serial No. 45,159

3 Claims. (Cl. 312—116)

The present invention relates to a humidor adapted for keeping produce such as vegetables and fruits in fresh condition. In a preferred embodiment of the invention the humidor takes the form of a display case and some features of the invention are of utility in display cases generally.

It is well known that there are many problems involved in the distribution and sale of produce as well as in the storage thereof in the homes of purchasers even for short periods of time. Most of the problems arise from the tendency of produce to wilt when exposed to ordinary atmospheric conditions in summer or winter and the spoilage which occurs especially in summer. Spoilage can be largely prevented by keeping the produce at a temperature above the freezing point of water but below about 50° F. but wilting occurs at such temperatures unless the relative humidity of the air is kept comparatively high. The present invention provides a convenient means for keeping produce under optimum conditions of temperature and relative humidity at home, in stores, markets, etc. It also provides an attractive display case adapted for use in stores which is much more economical of space than the usual produce counters, as well as stimulating sales and cutting down selling costs by reducing or eliminating spoilage.

The structure and advantages of the invention will become apparent from the following detailed description of the invention taken in conjunction with the drawings in which:

Fig. 2 is a vertical sectional view along the line 2—2 of Fig. 1;

Fig. 3 shows a similar vertical sectional view of a different embodiment of the invention;

Fig. 4 is a fragmentary isometric view showing details of construction;

Fig. 5 is a fragmentary sectional view along the line 5—5 of Fig. 4;

Figs. 6 and 7 are vertical sectional views (analogous to Fig. 2) of two modified embodiments of the invention.

Figure 1:
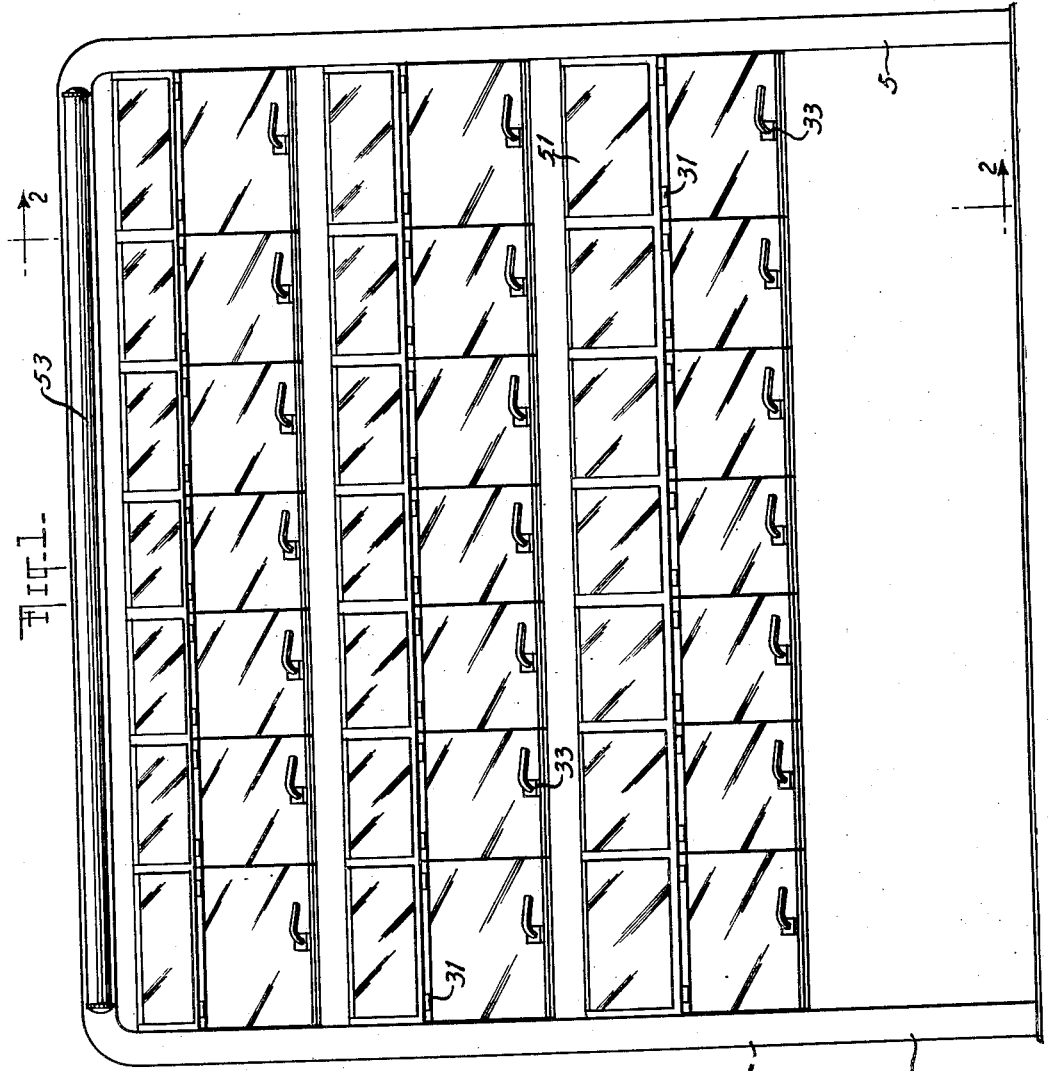
Fig. 1 is a front view of a display case embodying the invention.

Referring now to the drawings, Figs. 1 and 2 show a humidor and display case adapted for use in stores which sell fresh produce. It includes a cabinet 1 having a bottom wall 3, side walls 5, a rear wall 7, a front wall 9 and a top wall 10. These walls are insulated and may be constructed in any desired way from materials which are adapted to serve the functions of supporting the structure and limiting heat transfer between the surrounding atmosphere and the interior of the cabinet.

The front wall of the cabinet is provided with a plurality of angular recesses 11 at different levels, three such recesses being shown in the drawing but more or less can be provided as desired. Each recess has a lower wall 13 and an upper wall 15 as shown in Fig. 2. The lower wall 13 is provided with an opening 17 having a width conforming substantially with the outside dimensions of a container soon to be described and a length conforming to the combined overall dimensions of a plurality of said containers placed side by side. Traversing said opening 17 and dividing it into smaller openings are bars 19, as shown in Fig. 4, such a bar being positioned between adjacent containers. Angle supports 21 extend longitudinally through the cabinet from one side wall 5 to the other, each being supported thereby in position to receive the lower corners of a row of containers.

The containers, designated by reference numeral 23, are made of moisture-proof and rust-resisting material such as enameled sheet steel, stainless steel, glass, plastic, etc. They are preferably rectangular in section and in this form of the invention the side walls may advantageously taper from the outer open end 25 to the closed inner end, as shown in Fig. 5. The lower wall is also shown tapered in the same manner while the upper wall is shown normal to the plane of the open end. This is not an essential feature in this form of the invention because the space for air circulation between rows is quite adequate but it does give a maximum visibility of contents and reduces the storage space very little. The open end 25 is surrounded by a frame 27, which may be an integral flange as shown in Fig. 5. A lid or cover 29 is secured by hinges 31 either to the frame 27, which is generally preferred, or to the cabinet. A latch 33 is provided to keep the lid tightly closed and gasket material 35 is interposed so as to make the container substantially air tight. The gasket material is preferably made of rubber and may be secured either to the frame or to the lid as shown in Fig. 4. The lids are at least partly transparent so as to permit viewing the contents of the containers without opening them. The details of the construction of the lids is not part of the invention but it is obvious that a lid may be made of a plurality of spaced glass or transparent plastic panes set in a wooden or other frame. The space or spaces between the panes may be evacuated or filled with air or other gas to reduce heat transfer.

Each container is set into the opening 17 so that the frame 27 rests tightly against the wall 13 and the bar 19 which has a width preferably slightly less than twice the width of the frames 27 so that a plurality of containers can be positioned in a row with the frames tightly in contact with each other as shown in Figs. 4 and 5. Preferably the hinges 31 are at the top and the latch at the bottom of the lid so that it is self-closing. In order to prevent loss of cold air from the interior of the cabinet, gasket material 37 is interposed between the containers and the wall of the cabinet, e. g., in the manner shown in Fig. 2. The lower end of each container rests in the angle support 21 as shown in Fig. 2. This structure provides for readily removing the containers to be cleaned, sterilized, filled, etc., as desired.

It will be observed from Fig. 2 that the angle of the axis of the containers with the horizontal increases from the top row or level to the bottom level. The axis is an imaginary line normal to the plane of the open end 25 or frame 27 and passing through the center thereof. The purpose of the change in angle is to converge the axes of the different rows toward a point at about the eye level of the average purchaser a convenient distance from the cabinet so that the contents of the different rows of containers can be viewed without stretching or stooping. This novel arrangement is preferred but not essential and it is of general utility in display cabinets.

Means are provided for supplying cool air to the cabinet 1. This could take the form of a circulating system for drawing air from the outside, e. g., in the winter time, or an ice chest at the top of the cabinet, but ordinarily it is preferred to install a refrigerating system 41 in the cabinet which may comprise a motor 43, a compressor 45 and a coil 47 as those skilled in the refrigeration art will readily understand. A fan may be installed, if desired, to increase circulation of air around the containers 23. The arrangement shown in the drawings exposes five sides or walls of the containers to the air of the cabinet so that practically uniform cooling of these walls is achieved. It is preferred to keep the coil 47 at least 2½ inches away from the containers so that freezing of the contents is prevented. The containers may also be provided with means for humidifying the air in them if desired. With leafy vegetables such as lettuce, celery, spinach, etc., sufficient moisture may be supplied by wetting them before or after they are put in the containers, but with fruits, potatoes, etc., moisture may be supplied from a can or jar having an exposed wick which is moistened by a supply of water therein. Such a humidifying device can be suspended in the container at the top adjacent to the lid where it is out of the way of produce and does not interfere with access to the interior. The humidor not only keeps produce fresh under these conditions but it will freshen wilted produce and greatly increase its sales value.

The modification of the invention shown in Fig. 3 is the same in substance as that already described except that the cabinet is double depth and provided with two front walls 9 so as to provide access to containers 23 from both sides. Parts are numbered in this figure to correspond to like parts in Fig. 2. The form of Fig. 2 is especially adapted for use against a wall while that of Fig. 3 for use where access may be had from both sides.

Mirrors 51 may be mounted on the upper walls 15 of the angular recesses 11 where they tend to direct light rays into the containers and assist in illuminating the interior thereof so that a prospective purchaser can easily make good visual inspection of the contents. A light source 53, e. g., a neon or fluorescent tube is shown at the top of the cabinet where it serves for illuminating the containers and to attract attention to the display case.

Fig. 6 shows a somewhat different structure of the front wall and arrangement of the containers which is advantageous where it is desired to limit the height of the cabinet. In this embodiment of the invention the front wall, after rising vertically a desired distance, slopes upwardly toward the back either on a single angle or preferably a plurality of angles as shown so that the axes of the containers converge toward a point as described in Fig. 2. Parts in Fig. 6 corresponding to parts in Fig. 2 bear the same reference numbers.

The embodiment illustrated in Fig. 7 is similar to Fig. 2 except that each recess above the lowest one is set back farther from the plane of the bottom section of the front wall than the one immediately below it. The axes of the containers 23 in this figure are parallel but they may converge in the manner described for Fig. 2 if desired.

Figure 8:
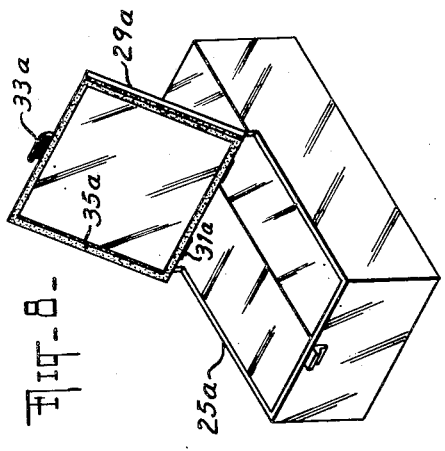
Fig. 8 depicts an isometric view of a humidor embodying the invention which is adapted for home refrigerators.

Fig. 8 shows a modified humidor 23a adapted for use in home refrigerators where it functions in the same way as the containers 23 of cabinet 1. It embodies the same novel features including an opening 25a in the top wall, a lid 29a pivoted to the top wall by hinges 31a, and a latch 33a to keep the lid tightly closed against the rim of the opening 25a. Gasket material 35a is preferably used to assist in making the joint airtight and it may be secured to the lid on the sides thereof which contact the side walls and either to the lid or the edge of the top wall at the joint between these parts. The lid need not be transparent since visibility of the contents is not so important in cases of this kind, although it may be transparent if desired.

Having thus described by specification and drawings the best embodiments of the principle of my invention of which I am now aware, what I claim as my invention is set forth in the following claims, it being understood that the invention is not limited to the specific embodiments used to illustrate the invention and that modifications and variations thereof which are within the scope of the claims are contemplated.

I claim:

1. A humidor and display case for produce comprising an insulated cabinet, a sloping wall portion in the front of said cabinet, an elongated rectangular opening in said wall portion, narrow bars traversing said opening in the plane of said wall portion and dividing it into smaller rectangular openings, gasket material on said bars and around said opening, an open ended container of rectangular section in each of said smaller openings having a rectangular frame surrounding its open end, said frames resting on said gasket material with adjacent frames close together to form a substantially air-tight closure for said openings, a hinged lid closing the open end of each of said containers, gasket material interposed between said lids and containers, a latch for keeping the lids tightly closed, and means for supplying cool air in said cabinet.

2. A humidor and display case for fresh produce comprising an insulated cabinet having a front wall provided with a plurality of elongated rectangular openings, the plane of said openings being on a substantial angle to the vertical, a plurality of narrow bars traversing each of said openings, said bars dividing said openings into smaller rectangular openings, gasket material on said bars and around said openings, an open ended container of rectangular section in each of said smaller openings having a rectangular frame surrounding its open end, said frames resting on said gasket material with adjacent frames along each of said elongated openings close together, a lid hinged to the upper portion of the frame of each of said containers and adapted to close the open end thereof, gasket material interposed between each lid and frame, a latch to keep each lid tightly closed, and means for supplying cool air in said cabinet.

3. A display case comprising a cabinet having a front wall provided with a plurality of elongated rectangular openings, the plane of said openings being on a substantial angle to the vertical, a plurality of narrow bars traversing each of said openings, said bars dividing said openings into smaller rectangular openings, an open ended container of rectangular cross-section in each of said smaller openings having a rectangular frame surrounding its open end, said frame resting on the rim of the opening in the front wall and on said narrow bars with adjacent frames close together, and a transparent lid hinged to said frame of each of said containers adapted to close the open end thereof.

HYRUM J. AMUNDSEN, Jr.

REFERENCES CITED

The following references are of record in the file of this patent:

UNITED STATES PATENTS

| Number | Name | Date |
| --- | --- | --- |
| 290,387 | Beatty | Dec. 18, 1883 |
| 801,401 | Roth | Oct. 10, 1905 |
| 1,222,687 | Sherer | Apr. 17, 1917 |
| 1,261,652 | Thorn | Apr. 2, 1918 |
| 1,335,286 | Leonard | Mar. 30, 1920 |
| 1,576,328 | Irwin | Mar. 9, 1926 |
| 1,589,002 | Smith | June 15, 1926 |
| 2,480,339 | Rifkin | Aug. 30, 1949 |
| 2,483,264 | Custer | Sept. 27, 1949 |
| 2,502,076 | Denton | Mar. 28, 1950 |